Figures 1, 2, 3:
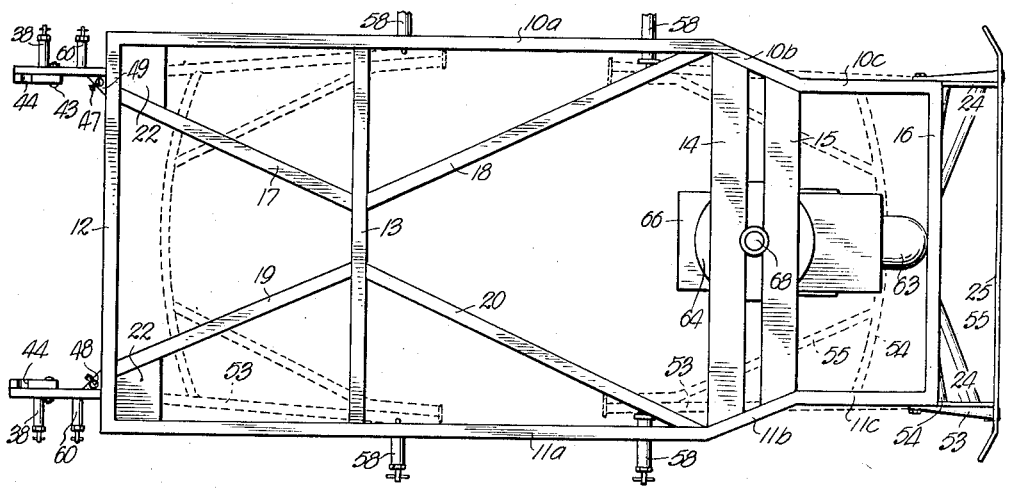

Aug. 21, 1951 M. J. RASBACH 2,564,996
SPRING CASTER FOR TRAILERS AND THE LIKE
Filed July 16, 1947 2 Sheets-Sheet 1

Inventor
Melvin J. Rasbach
By Thos. E. Scofield
Attorney

Aug. 21, 1951    M. J. RASBACH    2,564,996
SPRING CASTER FOR TRAILERS AND THE LIKE
Filed July 16, 1947    2 Sheets-Sheet 2

Inventor
Melvin J. Rasbach
By Thos. E. Scofield
Attorney

Patented Aug. 21, 1951

2,564,996

UNITED STATES PATENT OFFICE 2,564,996

SPRING CASTER FOR TRAILERS AND THE LIKE

Melvin J. Rasbach, Wichita, Kans.

Application July 16, 1947, Serial No. 761,199

1 Claim. (Cl. 16—44)

The present invention relates to trailers of the type commonly hitched to the rear of automobiles or other towing vehicles and it has for its general object to provide an improved caster for trailers adapted to meet light service requirements, for example at the hands of sportsmen and vacationers.

A further object is to provide an improved arrangement for resiliently supporting or springing the live load of the trailer without leaf springs and with a minimum of sway. Another object is to provide an improved caster or swivel type trailer wheel having incorporated therein mechanism for absorbing road shock and minimizing rebound.

Other and further objects of the invention will appear in the course of the following description.

In the accompanying drawings which form a part of the specification and are to be read in conjunction therewith and in which like reference numerals are employed to identify like parts of the various views.

Figure 4:
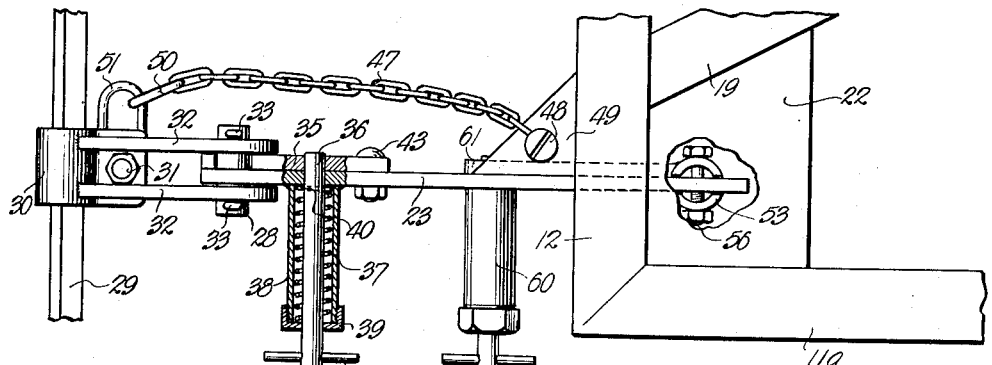
Figure 5:
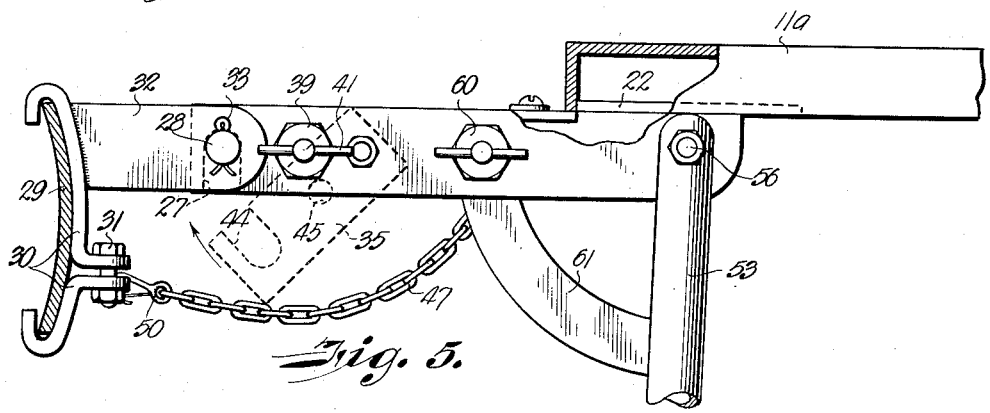
Figure 6:
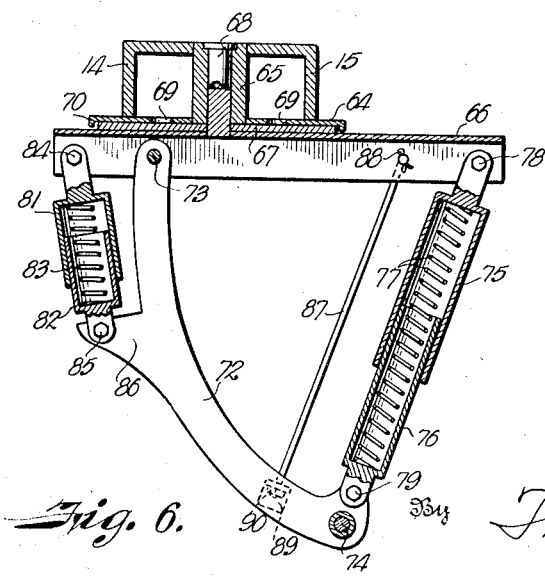

Fig. 1 is a plan view of the chassis of my one-wheel trailer,

Fig. 2 is a side elevational view of the chassis showing the stands or legs in lowered position, Fig. 3 is a front elevational view of the chassis showing the legs in lowered position, Fig. 4 is an enlarged plan view of the hitch by means of which the trailer is connected to the draft vehicle, parts being broken away for sake of illustration, Fig. 5 is an enlarged side elevation of the hitch, and Fig. 6 is an enlarged cross sectional view of the wheel mount taken along the line 6—6 of Fig. 3 in the direction of the arrows.

The body of my trailer forms no part of the present invention and has been omitted from the drawings in the interest of simplicity. Its form and relationship to the chassis are shown in my copending application, Serial No. D-134,993, filed November 21, 1946, now Design Patent No. 148,-327, issued January 6, 1948, from which it will be seen that the body is a low streamlined enclosed structure designed to be dust proof and storm or rain proof.

The chassis frame upon which the body rests and to which it is fastened is made of L-shaped angle iron channels assembled and welded together in a manner best seen in Fig. 1. It comprises a pair of longitudinal side rails (10a, 10b, 10c and 11a, 11b, 11c) maintained in laterally spaced relationship by the cross members 13, 14, 15 and 16, the assembly being reinforced and made rigid by diagonal braces 17, 18, 19 and 20. Gusset plates 22 reinforce the forward corners of the frame and also provide surfaces to which are welded the hitch bars 23. Rearward extension arms 24 welded to the frame carry a bumper 25.

Each of the hitch bars has at its forward extremity a slot 27 which is adapted to fit over a horizontal pin 28, the pin in turn being attached to the rear bumper 29 of the draft vehicle by means of a bumper clamp 30 (see Figs. 4 and 5). The clamp comprises hook-shaped upper and lower parts drawn together by a bolt 31, the upper part having a pair of rearwardly extending lugs 32 drilled to receive pin 28. Cotter keys 33 through the pin hold it against axial movement relative to the lugs.

When slot 27 in the hitch bar has been positioned over the horizontal pin 28 the hitch bar may be locked to the pin with the aid of a retaining member 35 and a spring biased latching bolt 36. The bolt and its associated spring 37 are housed in a barrel 38 welded at one end to the hitch bar and provided with a screw-on cap 39 at its opposite end. Free to slide axially in aligned holes in the cap and bar, the bolt has a pin 40 against which the compressed spring bears and thus it normally occupies the position shown. A handle 41 is provided for moving the bolt against the force of the spring.

The retaining member 35 is pivoted to the hitch bar at 43 and has a slot 44 adapted to be moved upwardly from below pin 28 as indicated by the arrow in Fig. 5 so that it and slot 27 in the hitch bar together completely encircle the pin. During such movement the latching bolt 36 is withdrawn out of the path of the retaining member by means of handle 41, but after the member has been positioned as described the bolt is allowed to return and enter the registering hole 45 in said member. This locks the retaining member securely to the hitch bar so that there is no danger of the latter becoming disconnected from the draft vehicle through vertical movement, as might occur in traveling over rough terrain.

A safety chain 47 is provided which has one end attached by a bolt 48 to the triangular reinforcing plate 49, this plate in turn being welded to the hitch bar and the chassis frame. At the free end of the chain is a hook-shaped snap clasp 50 adapted to be fastened to a U-shaped link 51 welded to the lower bumper clamp member 30.

A pair of stands are pivotally mounted on the chassis, each stand comprising two tubular legs 53 connected by a curved cross tube 54 and braced by tubes 55. Welded together, these tubes form a rigid assembly, the forward stand being pivoted to the hitch bar at 56 while the rear stand is pivoted to the extension arms at 57. The manner of attaching the stands is best shown in Figs. 4 and 5 from which it will be clear that the upper ends of the legs are slotted so the two halves thereof straddle the bar, the mounting bolt extending through aligned holes in the bar and opposite halves of the leg.

The stands normally are retained in raised position (shown dotted in Fig. 1) by means of latching devices 58; these are similar in construction to the latching device for the retaining member 35, already described, and have spring biased bolts adapted to enter the holes 59 in the legs 53 to maintain the stands in horizontal position adjacent the under side of the chassis frame. The forward stand may be locked in down position by similar latching devices 60 cooperating with curved braces 61 welded to the legs, these braces having suitable holes at their free ends for receiving the latch bolts.

The free-swiveling caster-type rubber-tired wheel 63 is mounted on the trailer by means of a trunnion plate 64 and a trunnion bearing 65 both welded to cross-pieces 14 and 15 of the frame. The wheel carriage comprises an inverted U-shaped channel 66 having a matching trunnion plate 67 welded thereto, the two trunnion plates being pivoted to one another by a trunnion pin 68. The upper plate is provided with apertures 69 to facilitate introducing a lubricant between the plates, and it also has a turned-down peripheral flange 70 to keep out road dust and grit.

A pair of laterally spaced, downwardly and rearwardly curved arms 72 are pivotally mounted on channel 66 by means of an elongated pivot pin 73 whose opposite ends are affixed to the side flanges of the channel. At their lower ends these arms carry the axle 74 of wheel 63. The arms permit the axle to swing rearwardly and upwardly under the influence of the trailer load, such movement being limited, however, by two load-bearing shock absorbers comprising telescoping tubes 75 and 76 housing a coiled compression spring 77. Tube 75 is pivoted to channel 66 of the wheel carriage at 78 while tube 76 is pivoted to the lower end of the arm at 79.

In travelling over rough terrain it will be understood that spring 77 yields in order to absorb road shocks. To cushion the rebound a pair of auxiliary shock absorbers are provided, each of these comprising a pair of telescoping tubes 81 and 82 housing a compression spring 83. Tube 81 is pivoted to channel 66 at 84 while tube 82 is pivoted at 85 to a forwardly projecting lug 86 on the wheel supporting arm. It has been found that this dual system of shock absorbers is exceedingly efficient in operation so that the body rides smoothly and evenly and with a total absence of sway despite adverse road conditions.

A pair of limit rods 87 prevent tubes 75 and 76 from coming apart even though the terrain is exceedingly rough. The upper end of each rod is bent at right angles so it will pass through a hole in the side flange of channel 66 and it is secured by a cotter pin 88. The opposite end of the rod slides freely in a hole provided in lug 89 welded to the arm 72, a nut 90 being screwed to the end of the rod below the lug to limit rebound; the permissible rebound obviously may be adjusted by screwing or unscrewing the nut.

It will be seen that the manner of attaching the trailer to the towing vehicle leaves the trailer free to pivot up and down about pins 28 thereby to accommodate the changes in elevation of the front and rear of the trailer which occur from moment to moment as the trailer is traveling. In other words, pins 28 forms a hinge whose axis is horizontal in order to permit vertical movement of the trailer and draft vehicle relative to one another. The hinge does not permit movement of the trailer in a horizontal plane relative to the towing vehicle, however; instead, the trailer always is aligned with its towing vehicle, the caster-like mounting of wheel 63 permitting the rear of the trailer to swing to the right or left as the draft vehicle changes course during its forward movement. The use of a single wheel permits the trailer to tilt about its longitudinal axis as the draft vehicle tilts and thus minimizes the strain imposed on both frames due to tilting.

When it is desired to park the trailer, bolts 36 and 58 are withdrawn to permit the latching members 35 and the front stand 53 to drop down. Then the hitch bars 32 are raised off of the pins 28 and the front stand is locked in its down position by means of the latching bolts 60. The trailer will remain upright on the front legs and wheel 63 alone, but when it is to be parked for any material period of time it is desirable to lower the rear stand as shown in Fig. 2 and take the weight entirely off the wheel. Both stands are provided with feet 91 to prevent same from sinking into the ground.

From the foregoing it will be seen that this invention is one well adapted to attain all of the ends and objects hereinbefore set forth together with other advantages which are obvious and which are inherent to the apparatus.

Inasmuch as many possible embodiments of the invention may be made without departing from the scope thereof it should be understood that all matter herein set forth or shown in the accompanying drawings is to be interpreted as illustrative and not in a limiting sense.

It will be understood that certain features and subcombinations are of utility and may be employed without reference to other features and subcombinations. This is contemplated by and is within the scope of the claim.

Having thus described my invention, I claim:

A trailer caster comprising a horizontal carriage adapted to be pivotally mounted on the trailer frame for rotation about a vertical axis, an axle, a wheel mounted on said axle a pair of laterally spaced arms extending downwardly and rearwardly from the forward portion of the carriage and straddling the wheel, the upper ends of said arms pivoted to said carriage and the lower ends of the arms having the axle affixed thereto, whereby the wheel is adapted to move up and down relative to said carriage, a forwardly extending lug on each arm, a pair of coiled compression springs disposed forwardly of the respective arms, each spring having one end connected to the carriage and the other end connected to one of said lugs to urge the wheel upwardly, a second pair of coiled compression springs disposed rearwardly of the respective arms, each of said last springs having one end connected to the carriage and the other end connected to one of the arms to urge the wheel downwardly, a pair of telescoping tubes housing each spring, a rod hinged at one end to the carriage, a sliding connection between the other end of the rod and one of said arms, said connection including a stop member on the rod limiting the downward movement of said wheel and means for adjusting said stop axially of the rod thereby to vary the downward limit of the wheel's movement.

MELVIN J. RASBACH.

REFERENCES CITED

The following references are of record in the file of this patent:

UNITED STATES PATENTS

| Number | Name | Date |
|---|---|---|
| 950,761 | Browne et al. | Mar. 1, 1910 |
| 1,022,225 | Chabot | Apr. 2, 1912 |
| 1,237,507 | Gregory | Aug. 21, 1917 |
| 1,285,929 | Cadman | Nov. 26, 1918 |
| 1,634,932 | Cook | July 5, 1927 |
| 1,794,630 | Linn | Mar. 3, 1931 |
| 2,057,655 | Anthony et al. | Oct. 20, 1936 |
| 2,087,299 | Pribil | July 20, 1937 |
| 2,174,465 | Jedlicka | Sept. 26, 1939 |
| 2,176,551 | Solem | Oct. 17, 1939 |
| 2,227,875 | Boden | Jan. 7, 1941 |
| 2,271,304 | Mulholland | Jan. 27, 1942 |

FOREIGN PATENTS

| Number | Country | Date |
|---|---|---|
| 473,737 | Great Britain | Oct. 19, 1937 |